Figure 5:
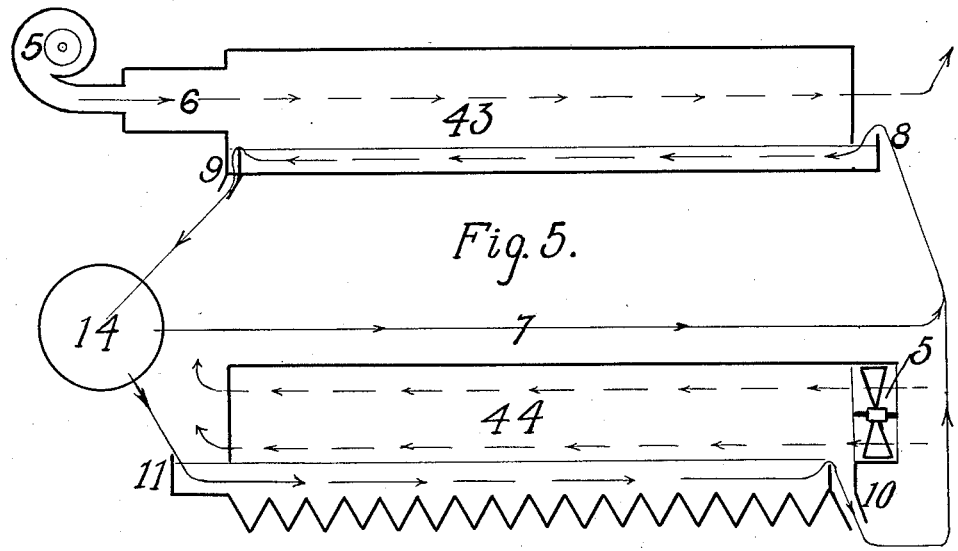
Figure 6:
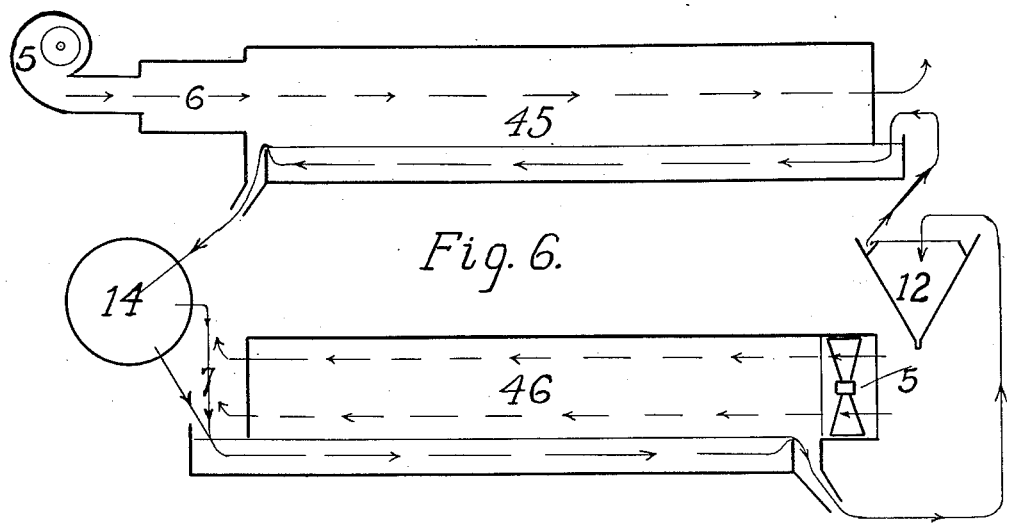

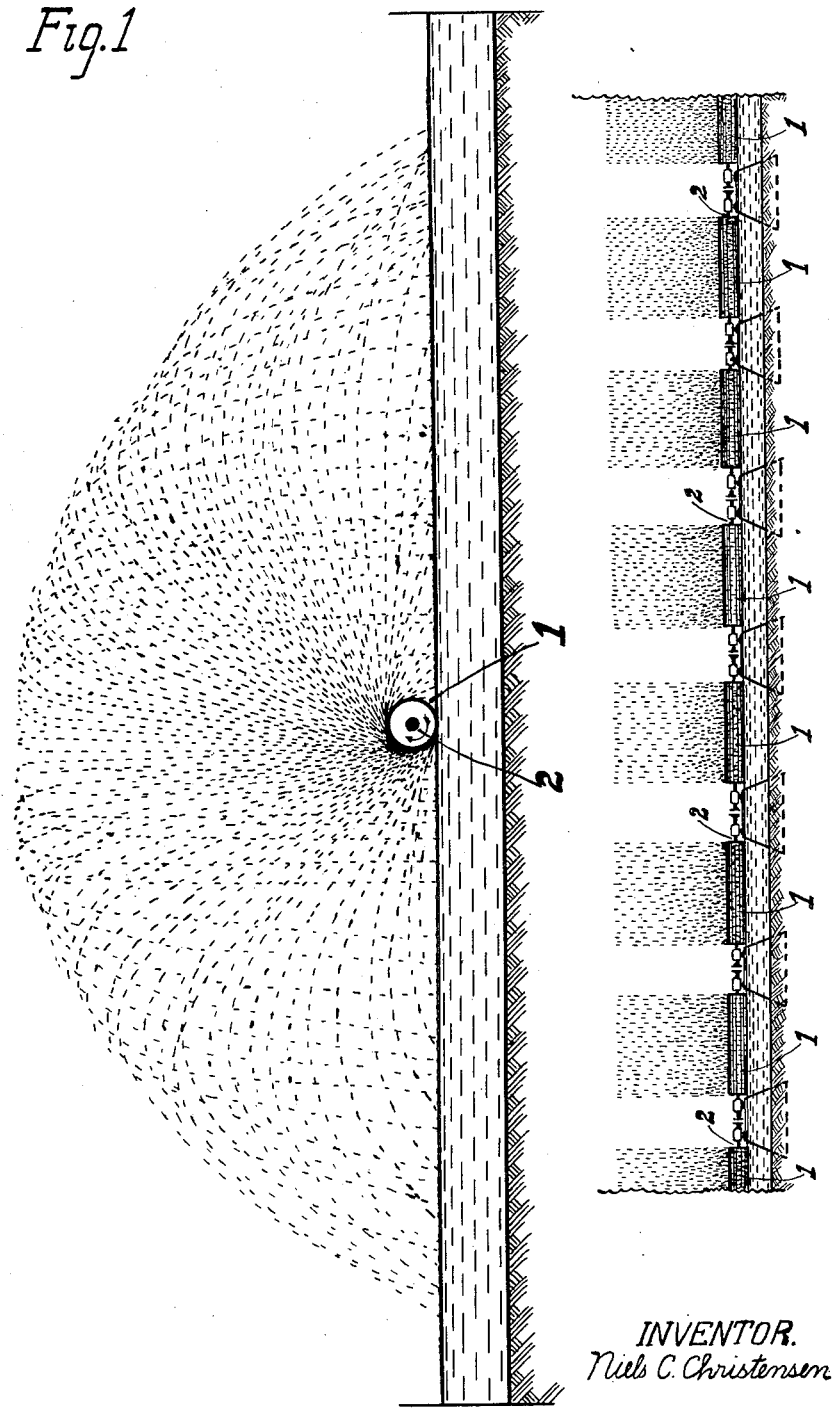

June 30, 1925.  1,544,130
N. C. CHRISTENSEN
PROCESS OF CONCENTRATING SOLUTIONS
Filed Dec. 3, 1920   3 Sheets-Sheet 2
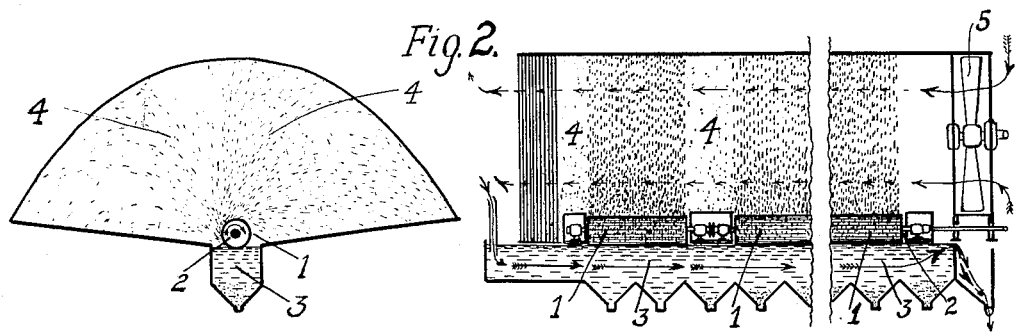
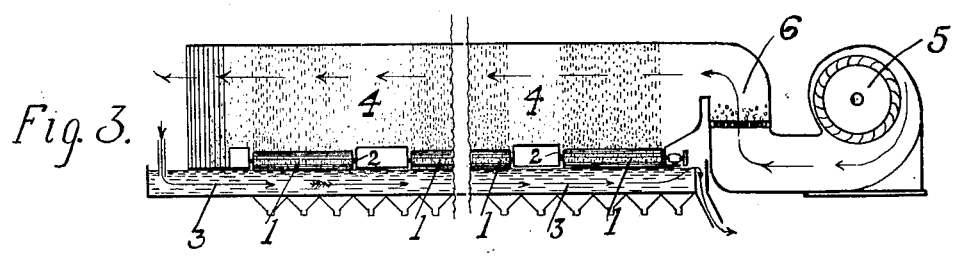
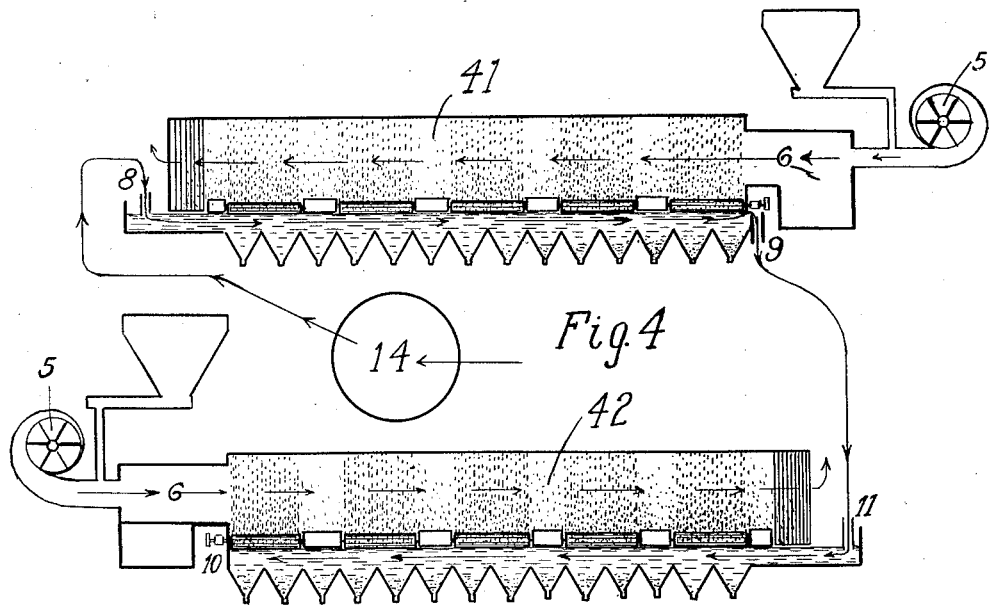
INVENTOR
Niels C. Christensen.

INVENTOR.
Niels C. Christensen.

Patented June 30, 1925.

1,544,130

UNITED STATES PATENT OFFICE.

NIELS C. CHRISTENSEN, OF SALT LAKE CITY, UTAH.

PROCESS OF CONCENTRATING SOLUTIONS.

Application filed December 3, 1920. Serial No. 428,127.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Concentrating Solutions, of which the following is a specification.

This invention relates to methods and processes for the dissolving of soluble materials in liquid solvent and the separation of the dissolved material from the solvent by crystallization from solution. It pertains particularly to those processes in which the soluble material is precipitated from solution by the concentration of the solution by evaporation, or by the cooling of a relatively concentrated (or saturated) solution or more especially by a combination of evaporation and cooling. My invention relates particularly to methods of heating and cooling the solutions and the evaporation of the solvent, and to combinations of these methods for the recovery of soluble salts from solutions or from mixtures with insoluble material. My process is applicable to the separation and recovery of a single salt or to the separate recovery of different salts from a mixture of soluble salts, and is especially advantageous in the latter case. My invention is applicable in metallurgical processes for the recovery of certain metals or salts, and in industrial and chemical plants for the preparation and separation and recovery of many different salts. Though part of my process may be used in many cases without the application of artificial heat, it has very special advantages in the application of heat to solutions for the purpose of securing concentrated solutions and for the purpose of evaporating the solvents, and very special advantages in the cooling and in the evaporation of relatively concentrated solutions in order to bring about the precipitation of salts therefrom. My process may be applied to the precipitation of salts by natural solar evaporation, but is specially advantageous in cases in which the heating and cooling and evaporation are brought about by artificial means, i. e., by the application of heat from burning fuel and the forced movement of air by means of fans. The great advantages of my process and methods over those now in use, are especially the very high mechanical efficiency and heat efficiency obtainable, and the simplicity and effectiveness of the apparatus used.

In methods of solar evaporation now in use, very large ponds and expensive pumping systems are required and the precipitated salts or mother liquors must be gathered from a comparatively great area. By the application of my process and methods to solar evaporation, the efficiency of the process may be so greatly increased that only a fraction of the space is required for the installation and the labor of collecting the products is greatly reduced.

The great difficulties encountered in the methods of artificial heating and evaporation and cooling and handling of relatively concentrated solutions of different salts now in use, are the expensive, cumbersome and inefficient methods of applying the heat to the solutions, and the clogging of the pipes and other apparatus by the precipitated salts in cooling, as well as the expensive and inefficient methods of cooling the concentrated solutions.

By my processes and methods I secure a very high mechanical efficiency and heating efficiency and avoid all the difficulties of clogging pipes and other apparatus, and the application of the heat and air for heating and cooling and evaporation is made in a very simple and efficient manner and by extremely simple efficient and relatively inexpensive apparatus.

The great advantages of my invention are secured particularly by the manner in which the gases for heating and evaporation and cooling are applied to the solutions.

My method for bringing about the evaporation of the solvent consists in forming a spray from the solution and bringing this spray into contact and mixture with the air or gases necessary for evaporation. As will readily be appreciated by those familiar with the problems involved in this kind of work, it is impracticable to make a spray from relatively concentrated salt solutions by means of spray nozzles owing to the clogging of the pipes and nozzles with salts and foreign solids. By my process all these difficulties are avoided. My method of making a spray from a solution and of bringing it into contact with a gaseous medium consists in bringing the upper surface of a body of the solution into contact with the lower part of a cylindrical surface (1) revolving around a horizontal axis (2). The drum or cylinder (1) is maintained practically tangent to the surface of the solution so as to dip but slightly in to the solution. As the pulley or drum (1) revolves it carries up a thin film of liquid and throws it from the surface in a fan of spray as illustrated in Fig. I. The amount and fineness of spray and the size of fan of spray will depend upon the size of cylindrical surface (pulley or drum) the number of revolutions and the depth to which the pulley dips in to the liquid. The faster the cylinder revolves, the finer the spray and the larger the fan of spray. i. e., the greater the distance the drops of liquid are thrown from the pulley or drum. The deeper the cylinder dips in to the solution, the larger the volume of spray and the coarser the spray. The required number of revolutions of the cylinder will vary with its size. For most purposes a twelve inch diameter cylinder has proved very efficient and the number of revolutions per minute from 500 to 800, depending on the character and amount of spray required, and the size of the fan of spray desired.

If my method of solar evaporation or of cooling in the open air is to be used, the revolving cylinders (pulleys or drums) are placed above the cooling pond or trough throwing the spray into the air and causing the evaporation or cooling desired.

In this way the required area of evaporation or cooling pond is reduced to a small fraction of that required without my process. The speed and efficiency of the operation may be greatly increased and the size of the required installation greatly reduced if my combined method of mechanical spray making is combined with an artificial movement of the air by means of fans. In this case the spray is enclosed in a tunnel of suitable cross-section, through which the air is forced in one direction by a fan and through which the solution flows in the opposite direction, thus securing the highest possible efficiency of evaporation and cooling. This process is illustrated in drawing No. II. The solution to be cooled or evaporated flows through the trough (3) in the direction indicated by the arrow. Above the solution and dipping very slightly into the solution are the drums or pulleys (1) revolving around the central horizontal shaft (2) and throwing a solid fan of spray filling the passage or tunnel (4). The tunnel is preferably of the shape shown which is approximately that of the fan of spray thrown by the cylinders, and should be of such size as to be completely filled by the spray. The tunnel (4) may however, be of any desired shape (in cross section), providing that it is of such size as to be filled by the spray. The required amount of air is blown through the spray in the tunnel from one end to the other by means of the fan (5) in the direction opposite to the flow of water (as indicated by the arrow) thus securing a counter-flow of air and sprayed solution, and the highest possible efficiency of cooling and evaporation.

For heating the solutions and evaporating the solvent in my process, the same method and apparatus as that described in the foregoing is used except that the air is heated before passing through the tunnel (4). This is illustrated in drawing No. III. The fan (5) forces the air through the furnace or heater (6) where it is heated to the required temperature and passes through the tube (4) in the direction opposite to the flow of solution. The heat may be supplied from the waste gases from a furnace or from fuel oil or gas or coaldust may be burned with the air supplied in a suitable furnace (6), or if the products of combustion must not come into contact with the solution the air may be heated in a suitable stove or heater (6). The most efficient method (i. e., as to amount of fuel consumed) is to pass the products of combustion directly through the spray in the tunnel (4). These hot gases may be diluted with colder air before passing into the tunnel, if desired. By this method the solutions may be heated to any desired temperature with a minimum of fuel and without encountering difficulties from the formation of crusts and clogging of pipes, etc., which causes so much trouble in the ordinary methods now used. In this way any desired amount of evaporation may also be secured with the greatest possible efficiency by regulating the volume and temperature of the gases leaving the tunnel. If desired the solutions may be boiled by this method with much less fuel than is possible by ordinary methods; and with no danger from formation of crusts and consequent burning of apparatus.

From the foregoing the extreme simplicity and flexibility and very high efficiency of the different steps used in my process will be apparent to all who are familiar with industrial and chemical and metallurgical operations of this kind.

Having described in a general way the methods used in the different steps of my process, a few of the very numerous applications of my process will be described.

The simplest application of my process using only the evaporation step, is exemplified in its application to the evaporation of salt solutions in open ponds by the action of the sun and wind in connection with my spraying process. In this case a number of the revolving cylinders are placed above a suitable cooling pond or trough just touching the surface of the brine (as indicated in Fig. I) and throwing the brine spray into the air and causing a very rapid evaporation of the water, resulting in the concentration of the brine and precipitation of the salt. If it is desired to increase the speed of evaporation and cut down the size of installation, the next simplest application of my process may be used in which the spray is thrown in a suitable tunnel (4) and air from a fan is blown through the tunnel (as illustrated in Fig. II) causing a rapid evaporation of the water and concentration of the brine, and precipitation of the salt. As the solution is cooled in this operation it may be advantageous in some cases to pass the solution in a circuit through a pond where it may be warmed by the sun's rays, then through the evaporator tunnel (4) and back again to the warming pond in closed circuit. If it is desired to still further increase the speed of the evaporator and further cut down the size of installation, the next simplest application of my process may be used. In this case the air for evaporation is heated before passing through the brine spray as illustrated in Fig. III, resulting in a very rapid evaporation and concentration of solution and quick precipitation of the salt. As previously noted, my process may be still further extended to the boiling of the solutions if desired in its next simplest form.

Another step yet may be added in the next form of my process by cooling the hot brine solution to get a further precipitation of salt. This may be done by my spraying process above open ponds or in a tunnel by means of a fan and counter-current of air and brine spray. This last step is not as much advantage in the precipitation of salt (NaCl) as in the recovery of potash salts and in hydro-metallurgical operations to be described.

In the case of potash salts the solutions or potash bearing material (solids) generally carry other salts from which it is desirable to separate the potash salts as far as possible.

In the case of brines carrying KCl such as the water of great Salt Lake or the drainage water from the mud flats around this lake, the brine may be first concentrated by any of the methods described in the applications of my process to the salt industry, resulting first in the deposition of most of the NaCl from solution. When the brines have reached the point where the KCl begins to deposit from the cold solution, it is advantageous to carry out the further evaporation of water and concentration of brine by heating the brine by the application of hot air or hot waste gases, in counter-current fashion, to the spray by my method as previously described. In this way the concentration of the solution in KCl may be greatly increased without precipitation of KCl and a large part of the remaining NaCl be precipitated out, since the solubility of the KCl increases much more rapidly with rise in temperature than does the NaCl. If the solution is heated and concentrated in this way until the hot solution (preferably near the boiling point) is approximately saturated with KCl and the next step of my process is used a very high grade KCl may be obtained carrying but a very small percentage of salt. This next step consists in cooling the hot concentrated KCl solution by means of one of my spray cooling steps as previously described, preferably by passing cold air in counter current to the solution through a spray tunnel as previously described. This cooling operation further evaporates the solution increasing the precipitation of KCl over that of the simple cooling operation without evaporation.

If the soluble salts are to be separated from a mixture with solids, as from the "caliche" in the Chilean nitrate industry several different methods may be used. The salts may be leached out of the mixture with cold water forming as concentrated a brine as possible (preferably by counter current leaching or counter current washing by agitation and decantation) and this solution may be concentrated and the nitrate salt be precipitated by the methods described in the previous case, preferably by the last complete process described consisting of heating and evaporating by the counter current passage of the solutions and hot gases through a concentrating tunnel, as described, to bring the hot solution practically to the point of saturation with the nitrate salt and then cooling this hot solution by the counter current passage of this hot solution and cold air through a cooling tunnel as described. The flow sheet of this operation is illustrated in drawing No. IV. The cold concentrated solution (indicated by the full line) from the leaching or washing operation (14) enters the tunnel (41) at the end (8) and flows through to the end (9) being continuously thrown into the gases as a spray by means of the revolving impellers.

The hot gases from the heater (6) are blown through the tunnel (4) entering at 9, in the direction opposite to the flow of solution, by the fan (5) and the solution thus heated by contact with the hot gases and concentrated by the evaporation of the water, (or other solvent in other cases) until the hot solution passing out at (9) is practically saturated (or highly concentrated) with the nitrate salt. This hot concentrated solution is then passed through the final heating or boiling tunnel (42) in which the solvent is finally evaporated away or boiled off by the hot gases passing through the tunnel from (10) to (11) as indicated. As indicated, there is no outflow of solution from (42) the solvent passing out as vapor and the salts being precipitated and removed from the bottom of the tunnel (the solution trough) by suitable conveyors or drags or through the spigots of hoppers in the solution trough as indicated by the arrows. During the concentration process in the tunnel (41) the less soluble salts such as NaCl will be precipitated and may be removed by means of suitable drags or screws or other conveyors or through the spigots of the hopper as shown.

If it is not desired to save the less soluble salts as NaCl a different method of applying my process may be used. In this case (as illustrated in the flow sheet shown in drawing No. V) the hot concentrated nitrate solution (or other solution in other cases) from the heating tunnel (43) is used to leach or wash the caliche (or other material in other cases) in the washing system (14). This hot solution will not take up the less soluble salts, such as NaCl, except in very small amount (which are therefore left in the solid residue), but will take up enough of the nitrate to saturate the hot solution. This hot concentrated (or saturated) solution is then passed through the cooling tunnel (44) in a direction from (11) to (10) in counter current to a stream of cold air blown through the tunnel (44) in the direction from (10) to (11) and the solution cooled and further concentrated by further evaporation of the water. During this cooling operation the nitrate salts are precipitated until the solution leaving the cooling tunnel at (10) is a practically saturated cold nitrate solution. This cold nitrate solution is continuously returned to the heating tunnel (43) at (9), and passed through the tunnel and heated and used to wash or leach more caliche (or other material in other cases) and then cooled again and more nitrate precipitated, and this cold solution returned again to the heating tunnel and so on in continuous cycle. Enough water to make up for the evaporation during heating and cooling must be added during each cycle and this water may be used to wash out the saturated nitrate solution left with the leached ore in each cycle, (indicated by the full line (7)) and then added to the cold solution before the latter is passed through the heating tunnel. As will be noted, this operation is mainly a heating and cooling operation instead of mainly one of evaporation as in the preceding case.

If a more soluble salt is to be separated from a mixture with less soluble salts the same procedure as in the foregoing may be used, as the excess of the less soluble salts will be insoluble in the hot saturated solution.

In this way such salts as potassium chloride and sodium nitrate can be separated very readily from the less soluble salts such as sodium sulphate and sodium chloride.

In the foregoing I have illustrated the applications of my process to the recovery of salts such as NaCl, KCl, $NaNo_2$, but my process is also especially applicable to the recovery of metallic salts in hydrometallurgical processes and will make possible the application of a number of such processes which have hitherto not been commercially applicable owing to the difficulties encountered in heating, cooling and evaporating salt solutions (and particularly acid-salt solutions) by the methods commonly used.

An excellent illustration of the application of my process in the hydrometallurgical work is in the treatment of lead ores to recover the lead therefrom as lead chloride, as described in my patent applications: No. 327,401, No. 329,397, No. 372,689, and as illustrated in the flow sheet given in drawing No. VI.

In this case the ore is treated with a hot concentrated brine solution (containing an acid or ferric chloride if necessary, to dissolve the lead and make a relatively concentrated lead solution. This hot pregnant lead solution is then cooled and the lead chloride precipitated out and separated from the cold brine. The cold salt solution is then heated and used for the dissolving of more lead in the treatment of more ore and so on in continuous cycle. The difficulty of carrying out such a process (especially with acid salt solutions) using the ordinary processes and apparatus in common use for heating and cooling and evaporating solutions, are almost inseparable, but with my process all these difficulties are overcome to such an extent that the process is relatively simple, efficient and inexpensive. The method of carrying out my process in this case will be apparent from the previous illustrations. The cold barren brine is passed through the heating tunnel (45) in counter current to the hot gases from the furnace (6) and thus heated (and part of the water evaporated) and then used to dissolve the lead from the ore in the leaching or dissolving plant (14). To this hot pregnant lead solution the dilute salt wash solution (7) from the leaching plant is then added and this solution is then cooled by contact of its spray with cold air in passing through the cooling tunnel (46) as previously described and the lead precipitated as lead chloride. The lead chloride is separated from the cold brine, by settling in the hoppers and settling basin (12), which is then returned to the heating tunnel (45) and heated for use in the treatment of more ore. In both the heating and cooling operations water is evaporated from the solution. This is made up by the addition of the wash water and there is therefore no accumulation of wash solution which is a very great advantage in the practical commercial operations of the process.

From the foregoing brief description of a few different methods of application of my process for the precipitation of salts from solution it will be apparent that my process has a wide and varied field of application and the great superiority in efficiency and simplicity and practicability of my process, in its many varied applications, as compared with methods now in use, will be apparent to all who are familiar with such processes and methods.

It is of course apparent to all that it is impossible to give in the scope of a patent application, a description of all the variations possible in the application of my process, or the minor details of operation of the few applications cited, and I do not therefore desire to be limited by the foregoing brief description, but only by the appended claims.

It is also apparent that it is impossible to specify all the salts or ores to the recovery or treatment of which my process may be applied and I do not therefore, desire to be limited by the salts or ores given as examples in the foregoing.

Having described my invention, what I claim and desire to patent is:

1. The process of concentrating solutions which consists in maintaining the upper surface of a body of the solution to be concentrated in contact with the lower part of a cylindrical surface revolving about a central horizontal axis, so that said cylindrical surface shall be approximately tangent to said liquid surface and shall dip slightly into said body of liquid, whereby a spray of said solution will be continuously thrown into the atmosphere surrounding said cylindrical surface and solvent thereby be evaporated from said solution causing the concentration of said solution.

2. The process of concentrating solutions and causing the precipitation of salts therefrom which consists in maintaining the upper surface of a body of the solution to be concentrated in contact with the lower part of a cylindrical surface revolving about a central horizontal axis, so that said cylindrical surface shall be approximately tangent to said liquid surface and shall dip slightly into said body of liquid, whereby a spray of said solution will be continuously thrown into the atmosphere surrounding said cylindrical surface and solvent be thereby evaporated from said solution causing the concentration of said solution, and the precipitation of salts therefrom.

3. The process of concentrating solutions which consists in causing said solution to flow longitudinally through the lower portion of a horizontal tunnel and maintaining the upper surface of the body of said solution in contact with the lower parts of a number of cylindrical surfaces revolving about horizontal central axes in said tunnel so that said cylindrical surfaces shall be approximately tangent to said liquid surface and shall dip but slightly into said body of liquid, whereby a spray of said solution will be continuously thrown into the part of said tunnel not filled by said body of solution, and passing a continuous current of air through said tunnel in a direction opposite to the flow of solution, whereby said spray and said air will be intimately mixed and the air passed through said tunnel at an angle to the movement of the spray, thereby evaporating solvent from said solution and concentrating said solution.

4. The process of concentrating solutions and causing the precipitation of salts therefrom which consists in causing said solution to flow longitudinally through the lower portion of a horizontal tunnel and maintaining the upper surface of the body of said solution in contact with the lower parts of a number of cylindrical surfaces revolving about horizontal central axes in said tunnel so that said cylindrical surfaces shall be approximately tangent to said liquid surface and shall dip slightly into said body of liquid, whereby a spray of said solution will be continuously thrown into the part of said tunnel not filled by said body of solution, and passing a continuous current of air through said tunnel in a direction opposite to the flow of solution, whereby said spray and said air will be intimately mixed, thereby evaporating solvent from said solution and concentrating said solution and causing the precipitation of salts therefrom.

5. The process of concentrating solutions which consists in maintaining the upper surface of a body of the solution in contact with the lower part of a cylindrical surface revolving about a central horizontal axis, so that said cylindrical surface shall be approximately tangent to said liquid surface and shall dip slightly into said body of liquid, whereby a spray of said solution will be continuously thrown into the atmosphere surrounding said cylindrical surface and solvent thereby evaporated from said solution and said solution thereby cooled and concentrated.

6. The process of concentrating solutions and causing the precipitation of salts therefrom which consists in maintaining the upper surface of a body of the solution in contact with the lower part of a cylindrical surface revolving about a central horizontal axis, so that said cylindrical surface shall be approximately tangent to said liquid surface and shall dip slightly into said body of liquid, whereby a spray of said solution will be continuously thrown into the atmosphere surrounding said cylindrical surface and solvent thereby evaporated from said solution and said solution thereby cooled and concentrated, whereby salts are precipitated therefrom.

7. The process of concentrating solutions which consists in causing said solution to flow longitudinally through the lower portion of a horizontal tunnel and maintaining the upper surface of the body of said solution in contact with the lower parts of a number of cylindrical surfaces revolving about horizontal central axis in said tunnel so that said cylindrical surfaces shall be approximately tangent to said liquid surface and shall dip slightly into said body of liquid, whereby a spray of said solution will be continuously thrown into the part of said tunnel not filled by said body of solution, and passing a continuous current of hot gases through said tunnel in a direction opposite to the flow of solution, whereby said hot gases will be intimately mixed with the spray and passed through said tunnel, thereby evaporating solvent from said solution and concentrating said solution.

8. The process of concentrating solutions which consists in bringing said solution into the lower part of a horizontal tunnel and maintaining the upper surface of the body of said liquid in contact with the lower parts of a number of cylindrical surfaces revolving about horizontal axes so that said cylindrical surfaces shall be approximately tangent to said liquid surface and shall dip slightly into said body of liquid, whereby a spray of said solution will be continuously thrown into the part of said tunnel not filled by said body of solution, and passing a continuous current of hot gases through said tunnel whereby said spray of solution and said hot gases will be intimately mixed, thereby heating said solution and evaporating solvent from said solution and concentrating said solution.

9. The process of concentrating solutions which consists in causing said solution to flow longitudinally through the lower portion of a horizontal tunnel and maintaining the upper surface of the body of said solution in contact with the lower parts of a number of cylindrical surfaces revolving about horizontal central axis in said tunnel so that said cylindrical surfaces shall be approximately tangent to said liquid surface and shall dip slightly into said body of liquid, whereby a spray of said solution will be continuously thrown into the part of said tunnel not filled by said body of solution, and passing a continuous current of hot gases through said tunnel in a direction opposite to the flow of solution, whereby said spray and said hot gases will be intimately mixed, thereby evaporating solvent from said solution, heating and concentrating said solution, and thereafter causing said hot solution to flow longitudinally through the lower portion of a horizontal tunnel and maintaining the upper surface of the body of said solution in contact with the lower parts of a number of cylindrical surfaces revolving about horizontal central axes in said tunnel so that said cylindrical surfaces shall be approximately tangent to said liquid surface and shall dip slightly into said body of liquid, whereby a spray of said solution will be continuously thrown into the part of said tunnel not filled by said body of solution, and passing a continuous current of air through said tunnel in a direction opposite to the flow of solution, whereby said spray and said air will be intimately mixed, thereby causing an evaporation of the solvent from said solution and a cooling and concentration of said solution with a consequent precipitation of salts therefrom.

In testimony whereof I have signed my name to this specification.

NIELS C. CHRISTENSEN.